United States Patent
Uchino

(10) Patent No.: US 7,355,637 B2
(45) Date of Patent: Apr. 8, 2008

(54) APPARATUS AND METHOD FOR MANAGING IMAGE DATA BY OBTAINING SPECTRAL REFLECTANCE

(75) Inventor: Fumiko Uchino, Kyoto (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 728 days.

(21) Appl. No.: 09/983,309

(22) Filed: Oct. 24, 2001

(65) Prior Publication Data

US 2002/0076219 A1    Jun. 20, 2002

(30) Foreign Application Priority Data

Oct. 27, 2000    (JP)    ............................. 2000-329137

(51) Int. Cl.
*H04N 9/73* (2006.01)
*H04N 5/76* (2006.01)
*H04N 5/222* (2006.01)

(52) U.S. Cl. ................. 348/224.1; 348/231.6; 348/370; 348/333.02

(58) Field of Classification Search ............. 348/221.1, 348/223.1, 224.1, 231.3, 231.6, 370, 371, 348/333.05

See application file for complete search history.

(56) References Cited

U.S. PATENT DOCUMENTS

| 5,528,293 | A * | 6/1996 | Watanabe ................. 348/231.2 |
| 5,568,194 | A * | 10/1996 | Abe ......................... 348/223.1 |
| 5,808,681 | A * | 9/1998 | Kitajima ..................... 348/371 |
| 6,310,648 | B1 * | 10/2001 | Miller et al. ........... 348/333.05 |
| 6,359,651 | B1 * | 3/2002 | Yokonuma .................... 348/370 |
| 6,426,771 | B1 * | 7/2002 | Kosugi .................... 348/222.1 |
| 6,529,235 | B1 * | 3/2003 | Tseng ....................... 348/223.1 |
| 6,600,511 | B1 * | 7/2003 | Kaneko et al. .......... 348/231.3 |
| 6,654,062 | B1 * | 11/2003 | Numata et al. ............. 348/362 |
| 7,002,624 | B1 * | 2/2006 | Uchino et al. ........... 348/225.1 |

FOREIGN PATENT DOCUMENTS

| JP | 09-098300 | 4/1997 |
| JP | 2000-115788 | 4/2000 |

* cited by examiner

*Primary Examiner*—Ngoc-Yen Vu
*Assistant Examiner*—Carramah J Quiett
(74) *Attorney, Agent, or Firm*—Buchanan Ingersoll & Rooney PC

(57) ABSTRACT

Object color data without an effect of illumination light is stored together with thumbnail image data generated on the basis of the object color data and data regarding illumination light so as to have a relationship therebetween, whereby the object color data is controlled visually.

25 Claims, 14 Drawing Sheets

APPARATUS AND METHOD FOR MANAGING IMAGE DATA BY OBTAINING SPECTRAL REFLECTANCE

RELATED APPLICATION

This application is based on application No. 2000-329137 filed in Japan, the entire content of which is hereby incorporated by reference.

BACKGROUND OF THE INVENTION

1. Field of the Invention

The present invention relates to a technology for controlling data regarding an object image by using a thumbnail image.

2. Description of the Related Art

Image processing for correcting the color tones and atmospheres of images have been carried out conventionally for images obtained as digital data by an image input apparatus, such as a digital camera. Color correction on the basis of white balance is typical of this kind of processing. In the correction on the basis of white balance, an image is corrected so that a white object can be seen white on the basis of the overall color balance of the image. As a result, the effect of the color of illumination light on an object is eliminated to some extent from the image, whereby the image is corrected to an image suited for the visual sensation of human beings.

On the other hand, a technology for obtaining images of an object illuminated by various light sources by operation processing has also been proposed. In this technology, data approximately corresponding to the spectral reflectance of the object (hereafter referred to as "object color data") is obtained in advance, and this data is combined with illumination light data, whereby object images in various illumination environments are reproduced.

However, the object color data differs from ordinary image data and cannot be indicated as an image. In other words, the object color data is image data wherein the object can be recognized for the first time when the object color data is combined with the illumination light data. For this reason, when using the object color data, it is necessary to guess what kind of image is included according to its file name, or it is necessary to actually reproduce the image by taking a time.

SUMMARY OF THE INVENTION

An object of the present invention is to solve the above-mentioned problem.

Another object of the present invention is to easily obtain object color data.

Still another object of the present invention is to provide an apparatus or method capable of easily managing the obtained object color data.

These and other objects of the present invention are attained by a camera having, first photographing means for obtaining first image data by photographing an object illuminated by ordinary light, second photographing means for obtaining second image data by photographing the object illuminated by the ordinary light and by light having known spectral characteristics, acquisition means for obtaining spectral reflectance of the object based on the first image data, the second image data and the known spectral characteristics, generating means for generating thumbnail image data on the basis of the obtained spectral reflectance and illumination data regarding predetermined illumination light; and a memory for storing the thumbnail image data and the spectral reflectance so as to have a relationship between the thumbnail image data and the spectral reflectance.

Furthermore, these and other objects of the present invention are attained by an image management method comprising receiving spectral reflectance of an object, wherein the spectral reflectance is based on first image data, second image data and known spectral characteristics of light; generating image data on the basis of the spectral reflectance and illumination data regarding a predetermined illumination light, and storing the image data and the spectral reflectance so as to have a relationship between the image data and the spectral reflectance.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
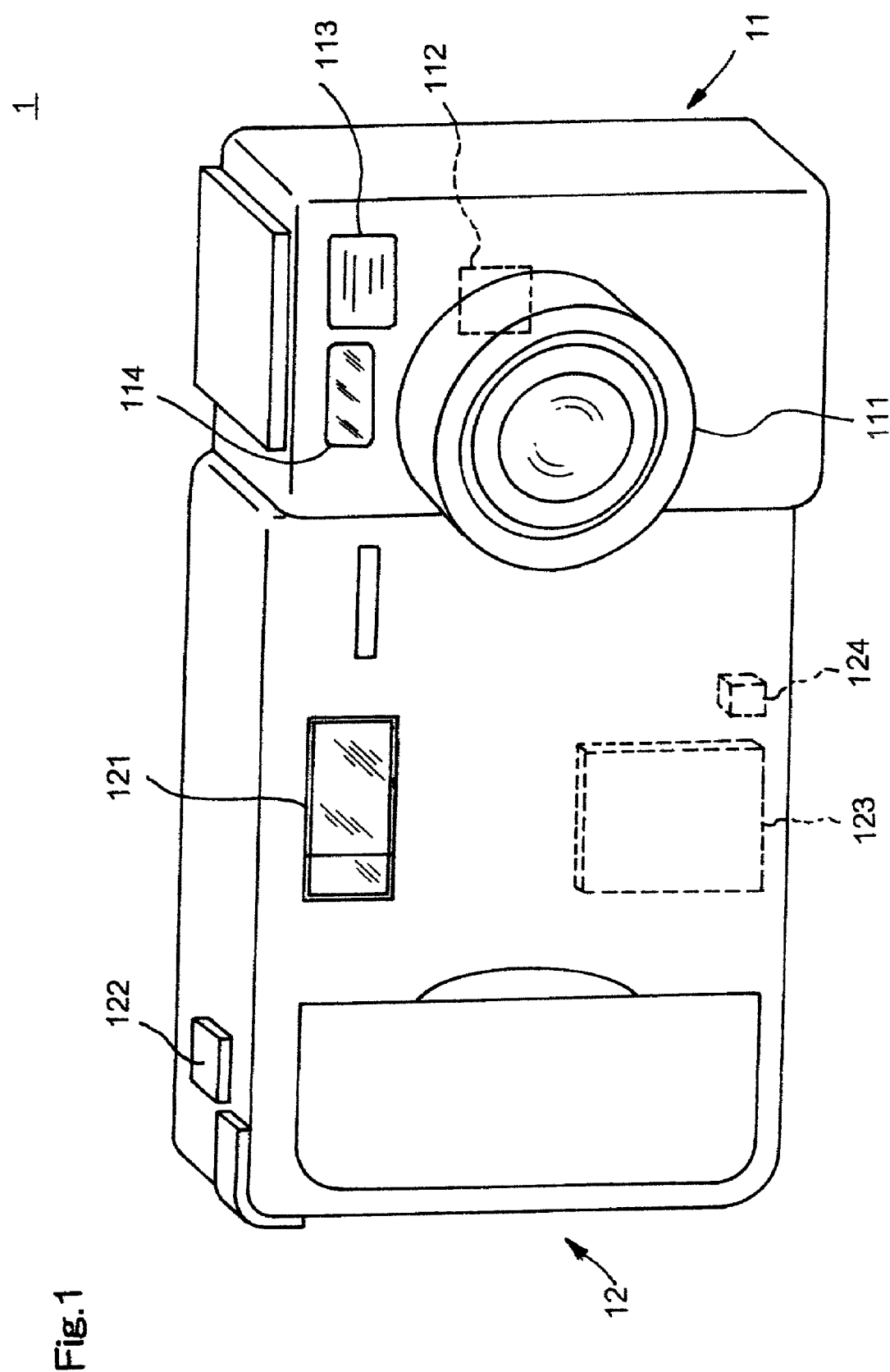
FIG. 1 is a perspective view showing the whole of a digital camera.

FIG. 1 is a perspective view showing the whole of a digital camera 1, a digital image pickup apparatus, in accordance with a first embodiment. The digital camera 1 obtains images and carries out image-related data control, such as thumbnail image generation and image reproduction.

The digital camera 1 comprises a lens unit 11 for carrying out photographing and a main unit 12 for processing an image obtained as digital data. The lens unit 11 comprises a lens system 111 having a plurality of lenses and a CCD 112 for obtaining an image of an object via the lens system 111. The image signal delivered from the CCD 112 is transferred to the main unit 12. Furthermore, the lens unit 11 is provided with a finder 113 for enabling a user to find an object and a distance measurement sensor 114. The main unit 12 is provided with a flash 121 and a shutter button 122. When the user views the object via the finder 113 and operates the shutter button 122, an image is obtained electrically by the CCD 112. At this time, the flash 121 emits light as necessary. The CCD 112 is a three-band image pickup sensor for obtaining a value regarding each of colors R, G and B as the value of each pixel.

The image signal from the CCD 112 is processed inside the main unit 12 as described later and stored in an external memory 123 (the so-called memory card) provided in the main unit 12 as necessary. The external memory 123 can be taken out from the main unit 12 by opening the lower lid of the main unit 12 and by operating an ejection button 124. The data stored in the external memory 123 used as a recording medium can be transferred to another apparatus, such as a computer, provided separately. Conversely, data stored in the external memory 123 by another apparatus can be read by the digital camera 1.

Figure 2:
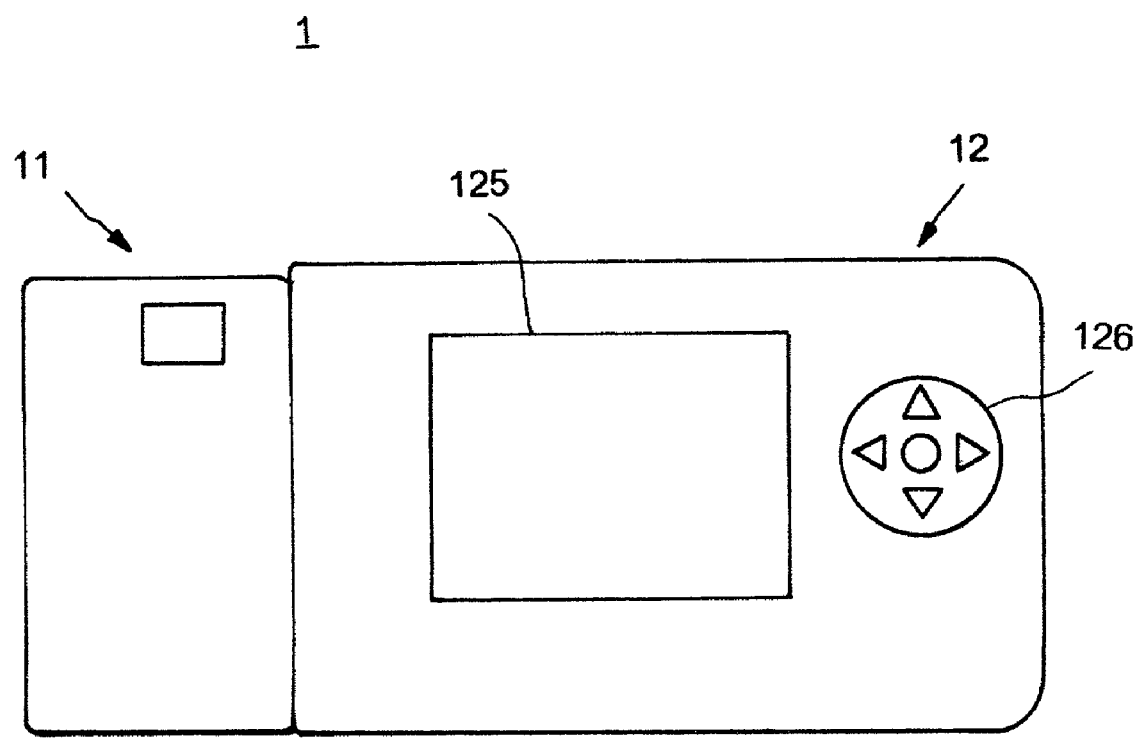
FIG. 2 is a rear view of the digital camera.

FIG. 2 is a rear view of the digital camera 1. A liquid crystal display 125 for displaying images obtained by photographing and for indicating menus for the user is provided at the center on the rear side of the main unit 12. An operation button unit 126 for carrying out input operations in accordance with the menus indicated on the display 125 is provided at one side of the display 125. This makes it possible to carry out the operation of the digital camera 1, the settings of photographing conditions, the maintenance of the external memory 123, image reproduction described later and the like. The operation button unit 126 has four buttons, i.e., the upper, lower, right and left buttons, and one center button.

Figure 3:
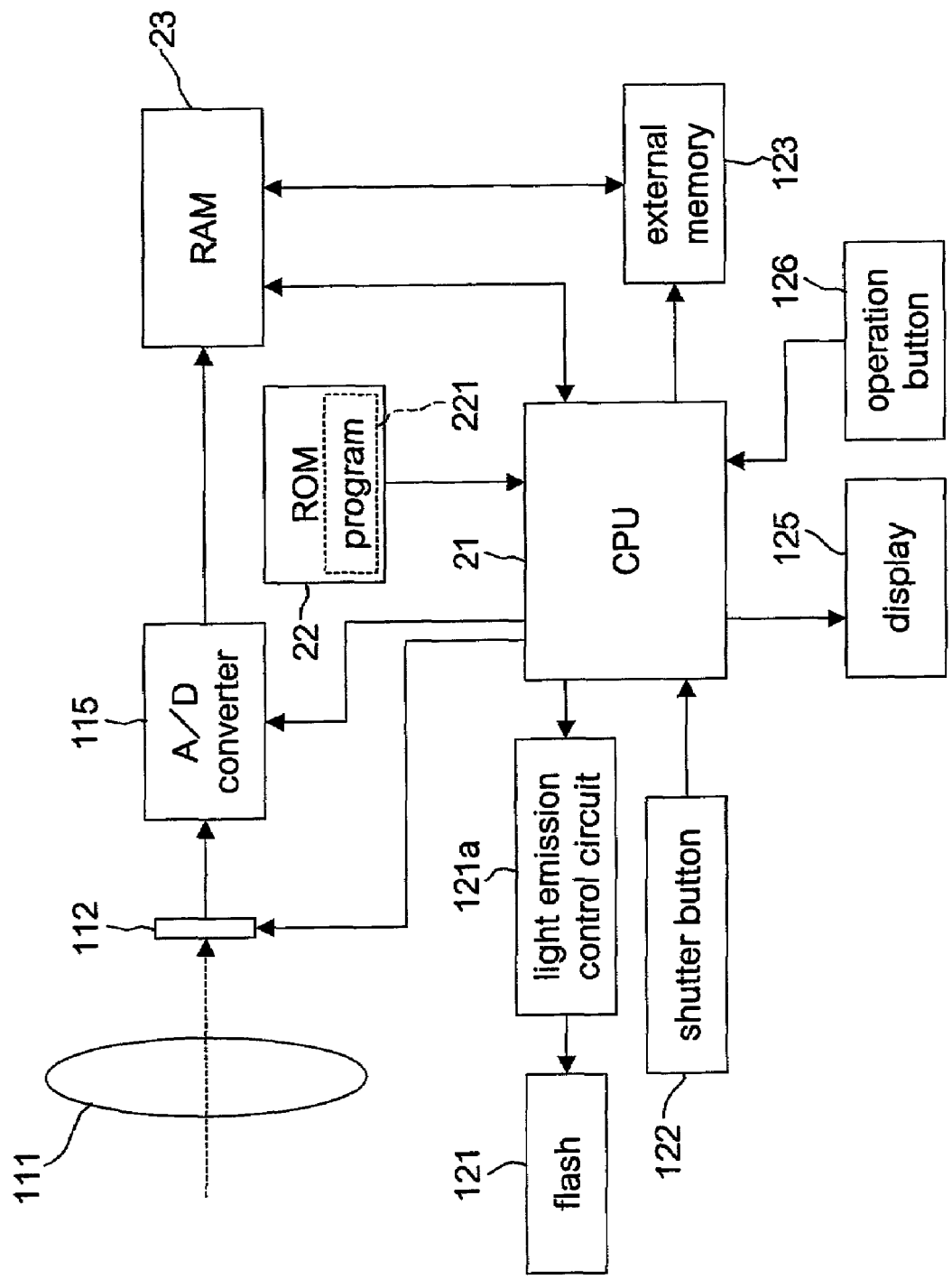
FIG. 3 is a block diagram for the image processing of the digital camera.

FIG. 3 is a block diagram for the image processing of the digital camera 1. The lens system 111, CCD 112, A/D converter section 115, shutter button 122, CPU 21, ROM 22 and RAM 23 in the configuration shown in FIG. 3 are used to obtain an image. In other words, an image of an object is formed on the CCD 112 by the lens system 111. When the shutter button 122 is pressed, an image signal from the CCD 112 is converted into a digital image signal by the A/D converter section 115. The digital image signal converted by the A/D converter section 115 is stored as image data in the RAM 23 of the main unit 12. The control of these processes is carried out by the CPU 21 that operates in accordance with a program 221 stored in the ROM 22.

Furthermore, the CPU 21, ROM 22 and RAM 23 of the main unit 12 also carry out image processing. More specifically, the CPU 21 processes the obtained image data in accordance with the program 221 stored in the ROM 22 while using the RAM 23 as a working area. The external memory 123 is connected to the RAM 23, and various kinds data are transferred in accordance with the input operation via the operation button unit 126. The display 125 indicates images and information to the user on the basis of signals from the CPU 21. The flash 121 is connected to the CPU 21 via a light emission control circuit 121a. When the light emission control circuit 121a receives a command for lighting the flash 121 from the CPU 21, the control circuit 121a controls light emission so that the light emission characteristics of the flash 121 do not vary at each time of photographing. As a result, the spectral distribution (spectral intensity) of the light from the flash 121 is maintained constant.

Figure 4:
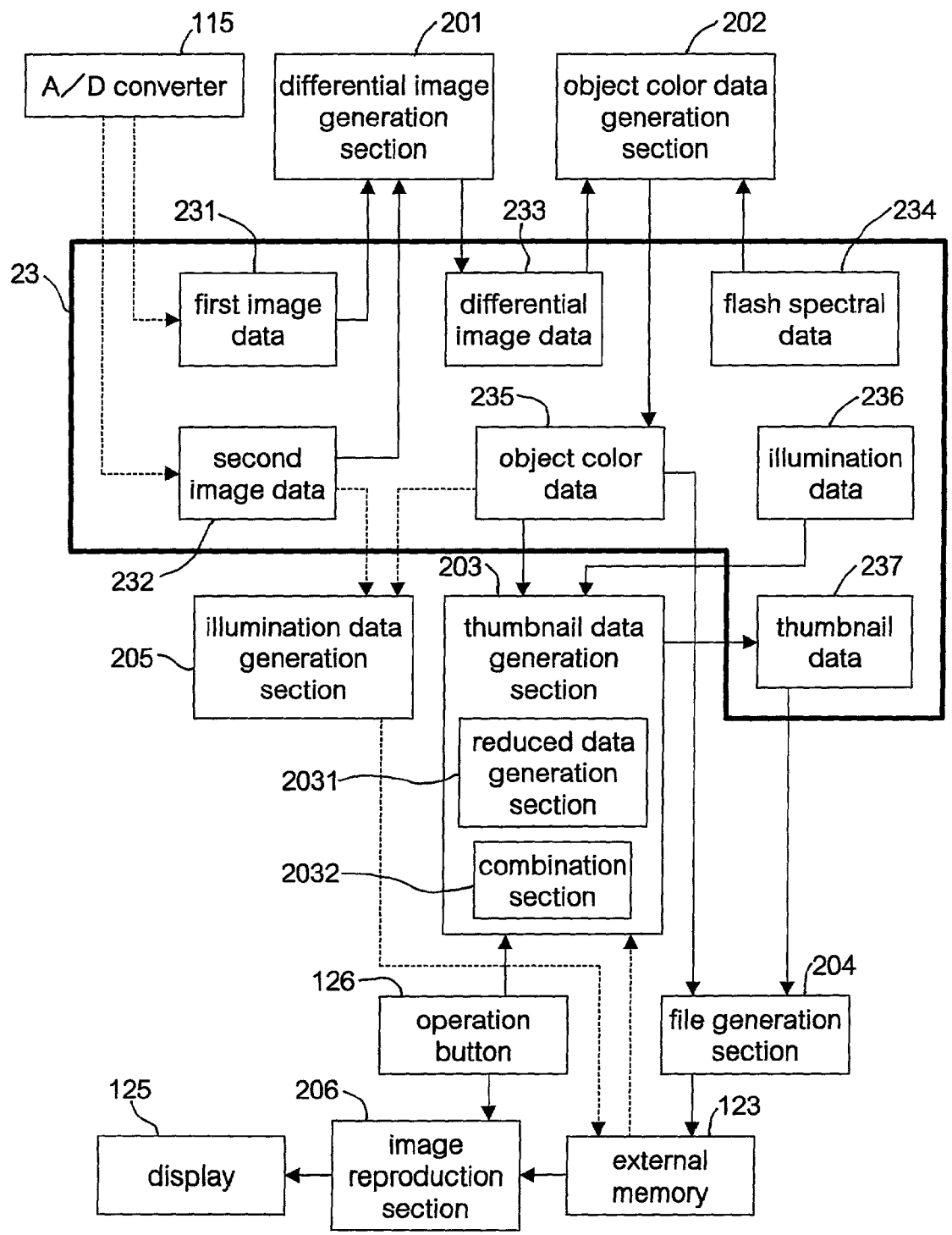
FIG. 4 is a block diagram showing a configuration of functions for the image processing of the digital camera.
Figure 5:
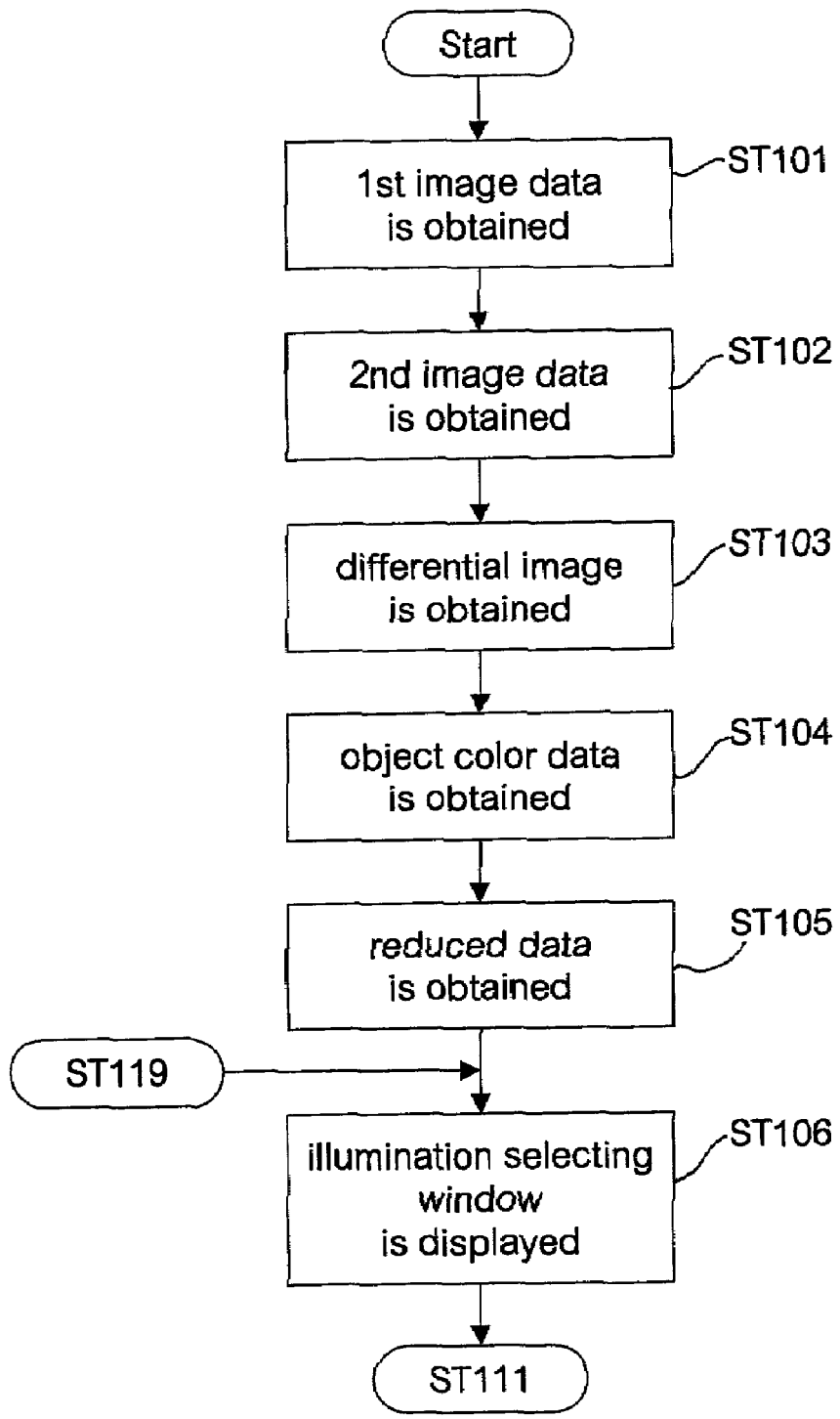
FIGS. 5 and 6 are flowcharts for obtaining image data.
Figure 6:
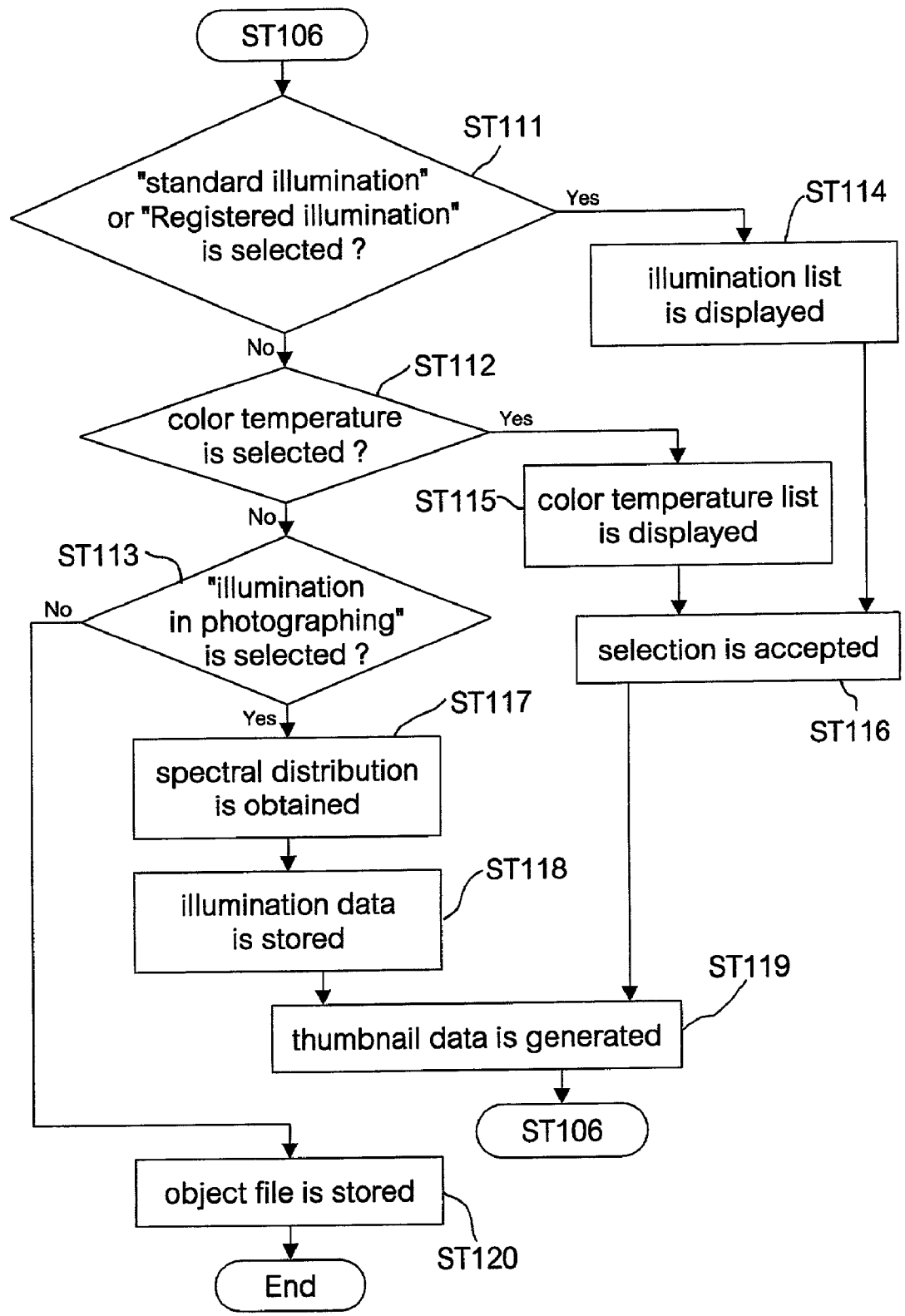

FIG. 4 is a block diagram showing a configuration of functions mainly attained by the CPU 21, ROM 22 and RAM 23, and also showing another configuration. FIGS. 5 and 6 are flowcharts for photographing and image processing. The differential image generation section 201, object color data generation section 202, thumbnail data generation section 203, file generation section 204 and illumination data generation section 205 in the configuration shown in FIG. 4 are functions attained by the CPU 21, ROM 22, RAM 23 and the like. The operation of the digital camera 1 will be described below referring to these drawings.

First, photographing is carried out in the ON state of the flash, and an image of an object exposed to flash light (hereafter referred to as a "first image") is obtained. In other words, the flash 121 is lit, and an image is obtained by the CCD 112. The obtained image (an image signal to be exact) is transferred from the A/D converter section 115 to the RAM 23 and stored as first image data 231 (at step ST101).

Next, photographing is carried out in the OFF state of the flash, and an image of the object in an illumination environment without flash light (hereafter referred to as a "second image") is obtained. In other words, an image is obtained by the CCD 112 without turning on the flash. The obtained image is transferred from the A/D converter section 115 to the RAM 23 and stored as second image data 232 (at step ST102).

Figure 7:
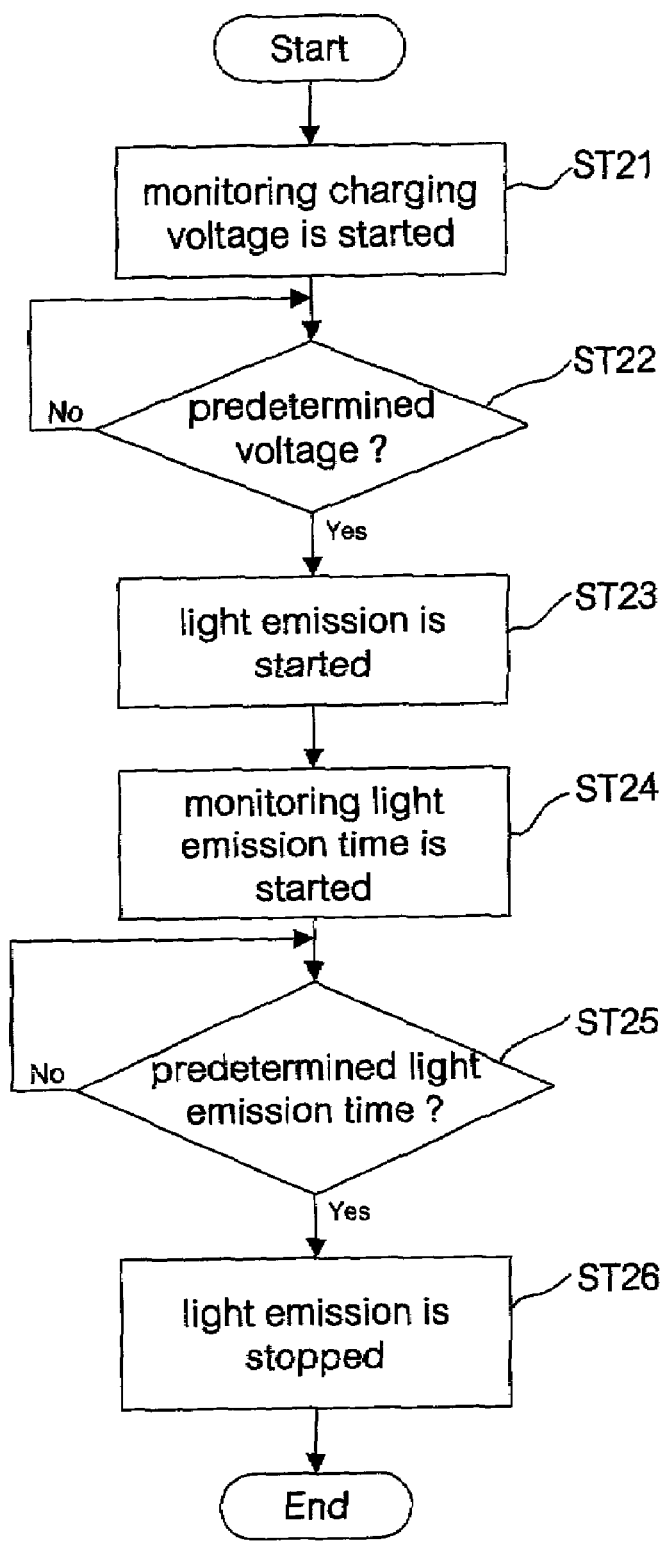
FIG. 7 is a flowchart for light emission control.

These two photographing operations are carried out promptly just like continuous photographing operations. Hence, the photographing range of the first image is the same as that of the second image. Furthermore, the two photographing operations are carried out in the same conditions with respect to shutter speed (the integration time of the CCD 112) and aperture value. At this time, the light emission of the flash 121 is controlled by the light emission control circuit 121a so that the spectral distribution of the flash light is constant. FIG. 7 is a flowchart showing the flow of the operation steps of the light emission control circuit 121a.

First, the light emission control circuit 121a starts monitoring the charging voltage supplied to the flash power source of the flash 121 (the voltage applied to the flash 121) at the time of photographing in the ON state of the flash or before photographing (at step ST21). When it is confirmed that the charging voltage has reached a predetermined voltage (for example 330 V) (at step ST22), electric power is supplied from the flash power source to the flash 121, and light emission starts (at step ST23). When the light emission starts, the light emission control circuit 121a starts monitoring a light emission time (at step ST24). When it is confirmed that a predetermined time has passed after the start of the light emission (at step ST25), light emission stops (at step ST26).

As described above, the light emission of the flash 121 is controlled so that the light emission voltage and the light emission time are constant. Hence, the light emission characteristics of the flash 121 do not vary at each time of photographing. In other words, the spectral distribution of the flash 121 is maintained constant by the above-mentioned light emission control. The spectral distribution of the flash 121 has been measured and stored in the RAM 23 (the ROM22 or other memory may also be used) in advance as flash spectral data 234. To be more precise, the relative spectral distribution (a spectral distribution normalized assuming that the maximum spectral intensity is 1 and hereafter referred to as a "relative spectral distribution") of the flash light is used as the flash spectral data 234.

When the first image data 231 and the second image data 232 are stored in the RAM 23 by the two photographing operations, the second image data 232 is subtracted from the first image data 231 by the differential image generation section 201 thereby to obtain differential image data 233. Hence, from the R, G and B values of the individual pixels of the first image, the R, G and B values of the corresponding pixels of the second image are subtracted respectively. As a result, the differential image between the first image and the second image is obtained (at step ST103 in FIG. 5).

Next, the component obtained by eliminating the effect of the illumination environment from the image by the object color data generation section 202 by using the differential image data 233 and the flash spectral data 234 is object color data 235 and stored in the RAM 23 (at step ST104). The object color data 235 substantially corresponds to the spectral reflectance of the object. The principle of obtaining the spectral reflectance of the object will be described below.

First, the spectral distribution of the illumination light (illumination light in an illumination environment including direct light and indirect light from a light source) for illuminating the object is $E(\lambda)$, and this spectral distribution $E(\lambda)$ is represented by the following expression by using three basis functions $E1(\lambda)$, $E2(\lambda)$ and $E3(\lambda)$ and weight coefficients $\epsilon 1$, $\epsilon 2$ and $\epsilon 3$.

$$E(\lambda) = \sum_{i=1}^{3} \varepsilon i Ei(\lambda) \qquad \text{(Expression 1)}$$

In a similar way, the spectral reflectance $S(\lambda)$ at a position on the object corresponding to a certain pixel (hereafter referred to as a "target pixel") is represented by the following expression by using three basis functions $S1(\lambda)$, $S2(\lambda)$ and $S3(\lambda)$ and weight coefficients $\sigma 1$, $\sigma 2$ and $\sigma 3$.

$$S(\lambda) = \sum_{j=1}^{3} \sigma j Sj(\lambda) \qquad \text{(Expression 2)}$$

The incident light $I(\lambda)$ (incident light in the case when a filter and the like in the lens unit 11 are ignored) on the target pixel of the CCD 112 is represented by the following expression.

$$I(\lambda) = \sum_{i=1}^{3} \varepsilon i Ei(\lambda) \cdot \sum_{j=1}^{3} \sigma j Sj(\lambda) \qquad \text{(Expression 3)}$$

Furthermore, a value regarding one of the colors R, G and B at the target pixel (hereafter referred to as a "target color") is $\rho c$. When the spectral sensitivity of the target color of the CCD 112 is $Rc(\lambda)$, $\rho c$ is represented by the following expression.

$$\rho_c = \int R_c(\lambda) I(\lambda) d\lambda \qquad \text{(Expression 4)}$$

When $\rho c1$ is the value of the target color of the target pixel in the first image in the ON state of the flash, and when $\rho c2$ is the corresponding value in the second image in the OFF state of the flash, the corresponding value $\rho s$ of the differential image is represented by the following expression.

(Expression 5)

$$\rho_s = \rho_{c1} - \rho_{c2} \qquad \text{(Expression 5)}$$

$$= \int Rc(\lambda)\{I_1(\lambda) - I_2(\lambda)\}d\lambda$$

-continued $$= \int Rc(\lambda)\left\{\sum_{i=1}^{3}(\varepsilon_1 i - \varepsilon_2 i)Ei(\lambda) \cdot \sum_{j=1}^{3} \sigma j Sj(\lambda)\right\}d\lambda$$

$$= \sum_{i=1}^{3}\sum_{j=1}^{3} \varepsilon s i \sigma j \left\{\int Rc(\lambda)Ei(\lambda)Sj(\lambda)d\lambda\right\}$$

$I1(\lambda)$ designates incident light on the target pixel in the ON state of the flash, and $\epsilon 11$, $\epsilon 12$ and $\epsilon 13$ are the weight coefficients of the basis functions regarding illumination light including the flash light. In a similar way, $I2(\lambda)$ designates incident light on the target pixel in the OFF state of the flash, and $\epsilon 21$, $\epsilon 22$ and $\epsilon 23$ are the weight coefficients of the basis functions regarding the illumination light excluding the flash light. In addition, $\epsilon si (i=1, 2, 3)$ is $(\epsilon 1i - \epsilon 2i)$.

In Expression 5, the basis functions $Ei(\lambda)$ and $Sj(\lambda)$ are predetermined functions. The spectral sensitivity $Rc(\lambda)$ is a function capable of being obtained by measurement in advance. These kinds of information are stored in the ROM 22 and the RAM 23 in advance. On the other hand, when the shutter speed (or the integration time of the CCD 112) and the aperture value are controlled so as to be identical for the two photographing operations, the differential image obtained by subtracting the second image from the first image corresponds to an image subjected to only the effect of the change in the illumination environment. In other words, an image wherein only the flash light is used as an illumination light source is obtained. The weight coefficient $\epsilon si$ can thus be derived from the relative spectral distribution of the flash light by a method described later.

Hence, only the three weight coefficients $\sigma 1$, $\sigma 2$ and $\sigma 3$ are unknown in the equation represented by Expression 5. Furthermore, the equation represented by Expression 5 can be obtained for each of the three colors R, G and B at the target pixel. In other words, the three weight coefficients $\sigma 1$, $\sigma 2$ and $\sigma 3$ can be obtained by solving these three equations. In other words, the spectral reflectance at the position on the object corresponding to the target pixel can be obtained.

Next, a method of obtaining the weight coefficient $\epsilon si$ will be described below. The differential image corresponds to the image wherein only the flash light is used as illumination light as described above. Furthermore, the relative spectral distribution of the illumination light on the differential image is known. On the other hand, an area on the object away from the flash 121 is less exposed to the flash light than an area near the flash 21. Hence, in the differential image, the position farther than the flash 121 usually appears darker.

Hence, while the relationship among the values of the three weight coefficients $\epsilon s1$, $\epsilon s2$ and $\epsilon s3$ is maintained constant, the values of these weight coefficients are changed in proportion to the luminance of the target pixel (or the area around the target pixel) in the differential image. In other words, when the luminance of the target pixel in the differential image is low, the values of the weight coefficients $\epsilon s1$, $\epsilon s2$ and $\epsilon s3$ are determined as small values. When the luminance is high, the values of the weight coefficients $\epsilon s1$, $\epsilon s2$ and $\epsilon s3$ are determined as large values. The relationship among the values of the three weight coefficients $\epsilon s1$, $\epsilon s2$ and $\epsilon s3$ is determined in advance so that the weight sum of the three basis functions $E1(\lambda)$, $E2(\lambda)$ and $E3(\lambda)$ is proportional to the spectral distribution of the flash light. In other words, the proportional relationship between the luminance and the weight coefficient $\epsilon si$ is obtained by measurement in advance.

The weight coefficient $\epsilon si$ is a value indicating the spectral distribution of the flash light applied to the position on the object corresponding to the target pixel. It is also a value indicating the spectral distribution of the amount of the change in the illumination light by the flash 121 between the first image and the second image. Hence, the processing for obtaining the weight coefficient $\epsilon si$ from the flash spectral data 234 corresponds to the processing for obtaining the amount of the spectral change in the illumination environment (illumination light) by the flash 121 from the relative spectral distribution of the flash light.

On the basis of the above-mentioned principle, the object color data generation section 202 of the digital camera 1 obtains the spectral reflectance (weight coefficients $\sigma 1$, $\sigma 2$ and $\sigma 3$) at a position on the object corresponding to each pixel while referring to the pixel values of the differential image data 233 and the flash spectral data 234. The spectral reflectance of the object corresponds to image data without the effect of the illumination environment and is stored in the RAM 23 as the object color data 235 (at step ST104).

When the object color data 235 is obtained, the reduced data generation section 2031 of the thumbnail data generation section 203 reduces the object color data 235 in accordance with the size (for example, a constant small size of 150×100 pixels) of a thumbnail image described later and generates reduced data (at step ST105). The object color data 235 is a set of weight coefficients for individual pixels. By thinning out pixels at a predetermined rate, the set of the weight coefficients for the thumbnail image can be generated as reduced data.

Figure 8:
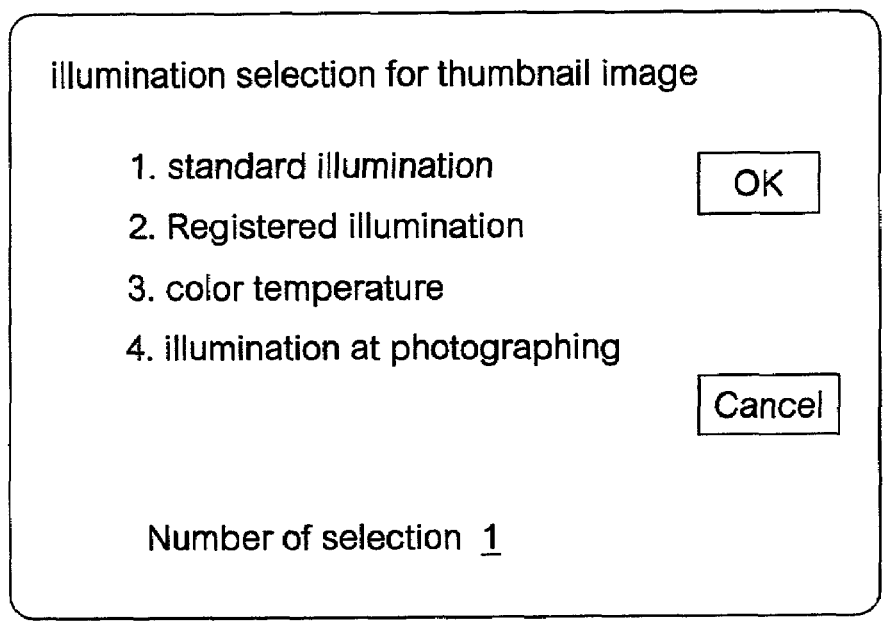
FIGS. 8, 9, 10 and 11 are views showing screen frames at the time of selecting illumination for thumbnail images.

When the reduced data is generated, a table of illumination (illumination data 236) used to generate the thumbnail image to be described later is shown on the display 125 (at step ST106). FIGS. 8 to 11 show screen frames of the display 125 for illumination selection. FIG. 8 shows an illumination selection menu. By operating the right and left buttons of the operation button unit 126, the items "Selection number," "OK" and "Cancel" are selected tentatively. In the item "Selection number," a number is selected by operating the upper and lower buttons. In other items, the selection is determined by operating the center button.

Figure 9:
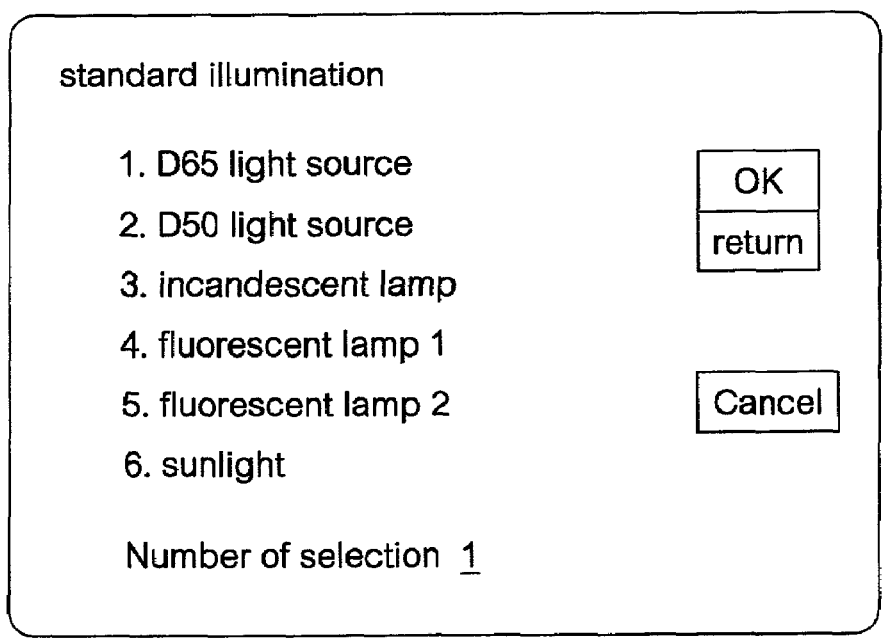
Figure 10:
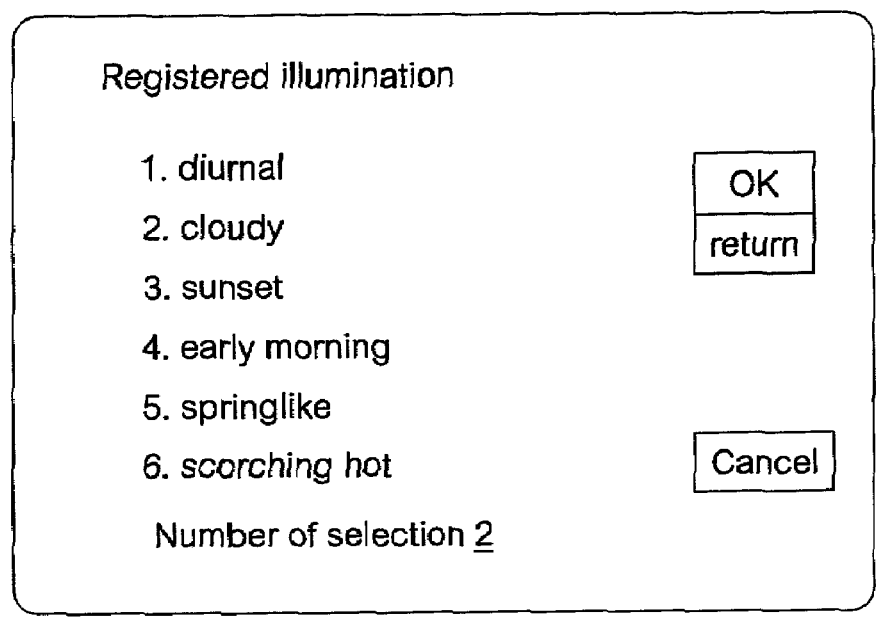
Figure 11:
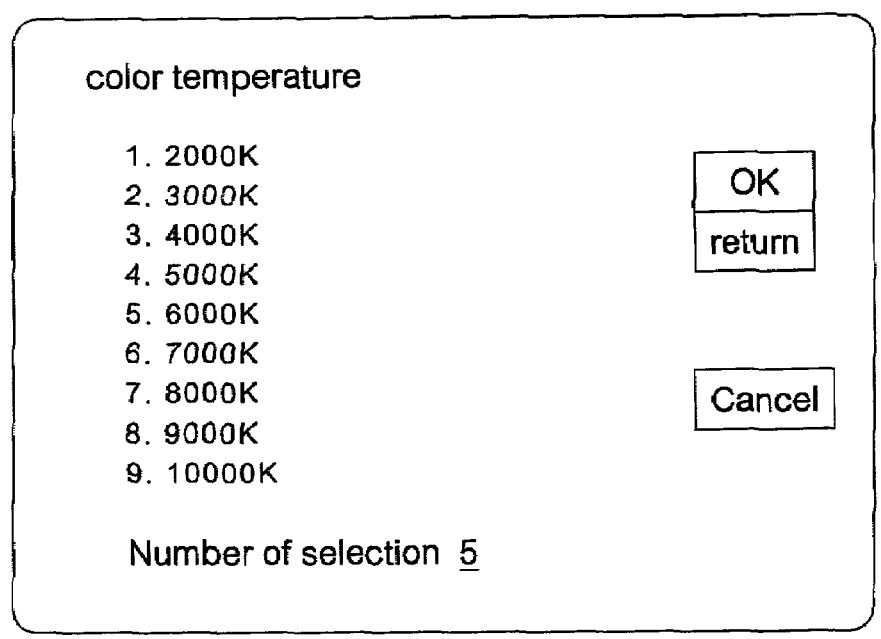

When "Standard illumination" is selected in FIG. 8 (at step ST111), the screen frame shown in FIG. 9 is indicated (at step ST114). In FIG. 9, it is possible to select "D65 light source" (a general standard light source), "D50 light source" (a standard light source for printing) and the like stored in the digital camera 1 in advance. When "Registered illumination" is selected (at step ST111), the screen frame shown in FIG. 10 is indicated (at step ST114). In FIG. 10, a table of illumination modes registered by the user is indicated. The method of registering the illumination modes will be described later. When "Color temperature" is selected in FIG. 8 (at step ST112), the screen frame shown in FIG. 11 is indicated (at step ST115). In FIG. 11, color temperature is selectable in the range of 2000K to 10000K at 1000K intervals. When "Illumination at the time of photographing" is selected in FIG. 8 (at step ST113), a thumbnail image is generated in the illumination at the time of photographing.

When an illumination number is selected on the screen frames shown in FIGS. 9 to 11 (at steps ST111 and ST112) and when "OK" is selected (at step ST116), the illumination data 236 corresponding to the illumination designated by the selected number is read from the RAM 23 to the thumbnail data generation section 203. The illumination data 236 is used to apply the effect of a specific type of illumination to the thumbnail image and is the spectral distribution data of the illumination light applied to the object.

The combination section 2032 of the thumbnail data generation section 203 combines the reduced data with the selected illumination data 236 to generate the data of the thumbnail image (hereafter referred to as "thumbnail data") (at step ST119). The illumination data 236 is the weight coefficients $\epsilon 1$, $\epsilon 2$ and $\epsilon 3$ when the spectral distribution of the illumination light is represented by the weight sum of the basis functions as indicated by Expression 1. By using the weight coefficients $\sigma 1$, $\sigma 2$ and $\sigma 3$ of each pixel in the reduced data and the weight coefficients $\epsilon 1$, $\epsilon 2$ and $\epsilon 3$, the operation indicated by Expression 3 is carried out to obtain incident light $I(\lambda)$. $I(\lambda)$ corresponds to the spectral distribution of the light incident on a pixel (a pixel to be subjected to operation) of the digital camera 1 when it is assumed that an object is photographed in the selected illumination.

By carrying out the operation indicated by Expression 4 with respect to $I(\lambda)$, the value of each of the colors R, G and B is obtained as the value of each pixel in the thumbnail image. As a result of this processing, the thumbnail data 237 of the thumbnail image to be shown on the display 125 is generated by using the values of the colors R, G and B, and stored in the RAM 23.

On the other hand, when "Illumination at the time of photographing" shown in FIG. 8 is selected (at step ST113), three equations regarding the weight coefficients $\epsilon 21$, $\epsilon 22$ and $\epsilon 23$ are obtained on the basis of each of the values of the colors R, G and B of each pixel in the second image by the illumination data generation section 205 in accordance with Equations 3 and 4. By solving these equations, the illumination data generation section 205 obtains the weight coefficient $\epsilon 2\,i$ regarding each pixel in the second image. The obtained weight coefficient $\epsilon 2i$ of each pixel becomes a component indicating the effect of illumination environment without the flash light on the second image.

The weight coefficient $\epsilon 2i$ of each pixel may be taken directly as illumination data. However, in the case of an illumination environment by nearly uniform illumination light, the weight coefficient $\epsilon 2i$ of each pixel has a small variation. Each of the weight coefficients $\epsilon 21$, $\epsilon 22$ and $\epsilon 23$ is averaged for all the pixels, and the obtained three weight coefficients are regarded as illumination data (when various items are used as the basis function Ei, the basis function Ei may be included in the illumination data) (at step ST117). Hence, the illumination data is independent of the positions of pixels. By combining the illumination data with the object color data 235 as described later, an atmosphere in an illumination environment at the time of photographing can be taken in an image of another object. The generated illumination data is stored in the external memory 123 (at step ST118).

When the newly generated illumination data is stored in the external memory 123, an appropriate name is assigned to the illumination data on the basis of input by the user via the operation button unit 126. The name may be determined as desired. However, the selection of the illumination data can be carried out more easily by using a name indicating the feeling (sensitivity) received by an observer depending on the illumination environment.

More specifically, the name may be represented by words indicating the sense of the seasons, such as "springlike" and "midsummer," words indicating the sense of the time of the day, such as "sunset," "early morning" and "early afternoon," words indicating the sense of the temperature, such as "cold" and "scorching hot," and words indicating the sense of the weather, such as "foggy" and "cloudy." The added names of the illumination data 236 are added to the items on the screen frame shown in FIG. 10 at the time of the next photographing.

The flash spectral data 234 and the illumination data 236 prepared in advance have been stored in the RAM 23 as shown in FIG. 4. However, these kinds of data may be stored in the ROM 22 or the external memory 123.

When the illumination data regarding the illumination at the time of photographing is generated, the illumination data is combined with the reduced data, thereby generating the data of the thumbnail image in the illumination environment at the time of photographing. The generated data is stored in the RAM 23 as the thumbnail data 237 (at step ST119). By generating the thumbnail image in the illumination environment at the time of photographing, it is possible to understand what kind of illumination was used when the object color data is obtained.

When data of a thumbnail image is generated, the indication on the display 125 returns to the menu screen frame shown in FIG. 8 (at step ST106). When illumination items are selected further (at steps ST111 to ST113), data of another thumbnail image is generated. When data of a required number of thumbnail images is generated, "Cancel" is selected on the screen frames shown in FIGS. 8 to 11, thereby completing the procedure for generating the thumbnail data 237. When "Return" is selected on the screen frames shown in FIGS. 9 to 11, the screen frame returns to that shown in FIG. 8.

When the thumbnail data 237 is generated, the object color data 235 and the thumbnail data 237 are transferred to the file generation section 204. The file generation section 204 generates a file wherein information for specifying the thumbnail data 237 and the illumination data 236 (hereafter referred to as "illumination information") that was used when generating the thumbnail data 237 is stored in its header and the object color data 235 is stored in its entity portion. The generated file (hereafter referred to as an "object file") is stored in the external memory 123 (at step ST120).

Figure 12:
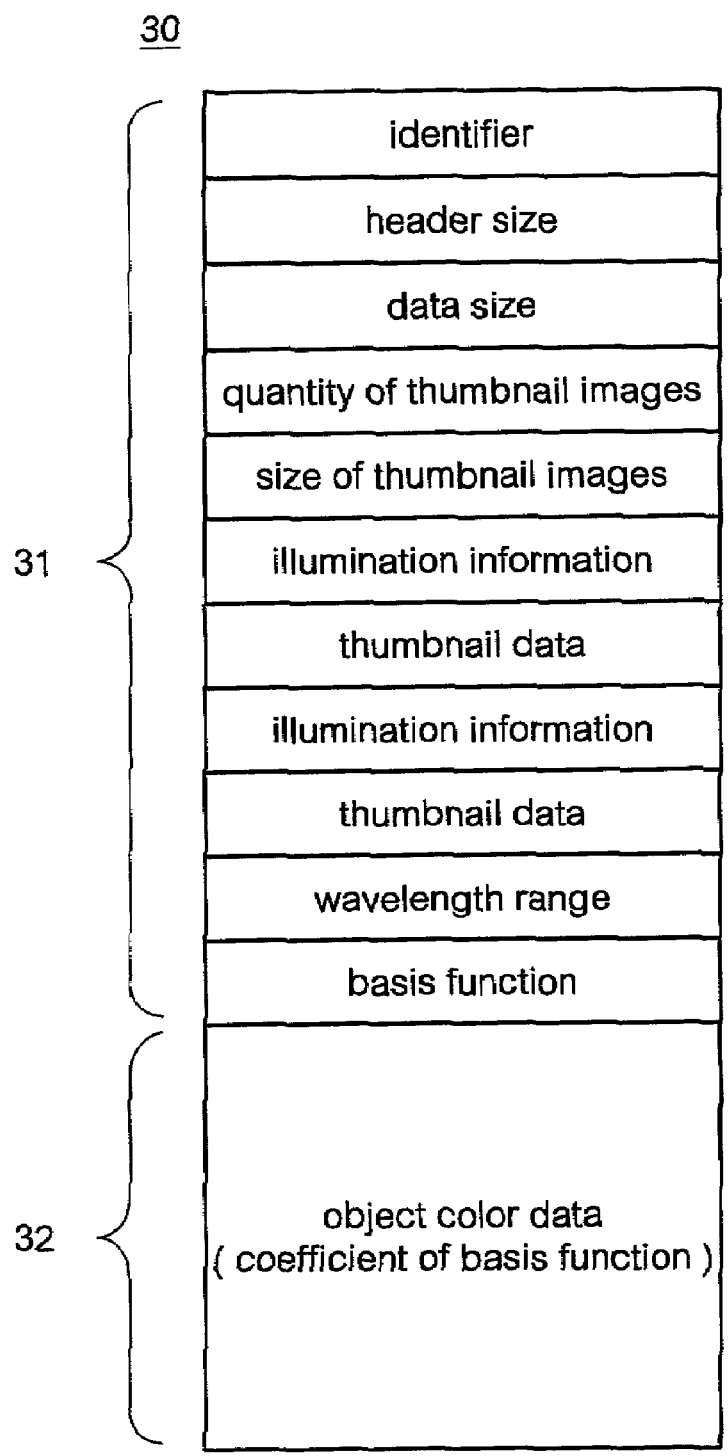
FIG. 12 is a view showing the data structure of an object file.

FIG. 12 is a view showing the structure of an object file 30. In the header 31 of the object file 30, an identifier indicating that the file is an object file, the size of the header and the size of the data (the size of the object color data) are stored as basic items. In addition, the quantity of the thumbnail images, the size of the thumbnail images, thumbnail data corresponding to at least one thumbnail image and illumination information are also stored in the header as items regarding thumbnail data. Furthermore, the wavelength range at the time of operation processing and the basis function $Si(\lambda)$ of the spectral reflectance are also stored as items to be used at the time of image reproduction. Still further, the illumination data (weight coefficients and basis functions) used for generating the thumbnail data, camera settings at the time of photographing (shutter speed, exposure value, etc.) and the like may be included in the header 31.

In the entity portion 32 following the header 31, groups of the weight coefficients of basis functions are stored as the object color data 235.

Figure 13:
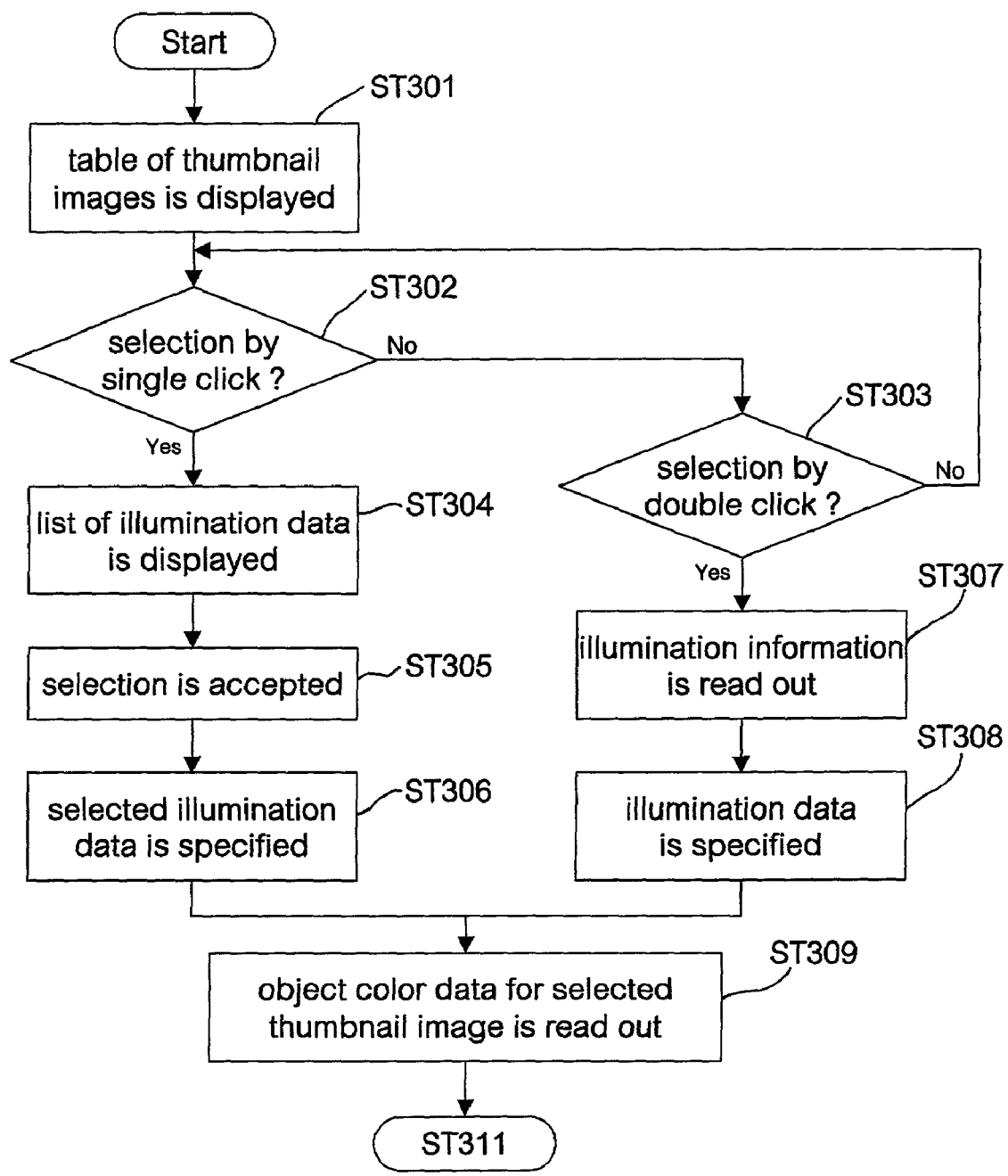
FIGS. 13 and 14 are flowcharts for image reproduction.
Figure 14:
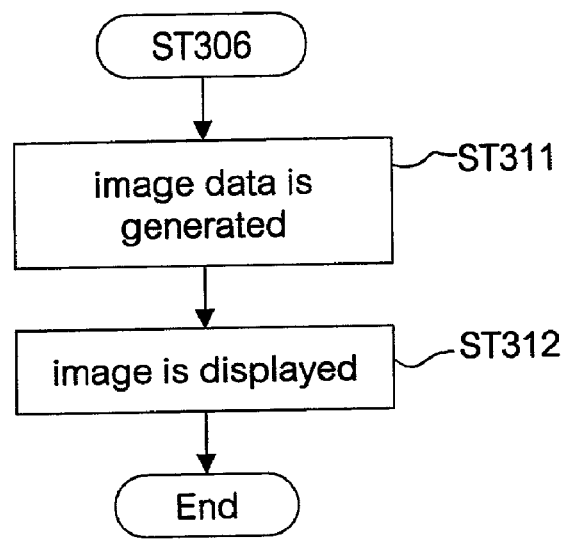

Next, the operation of the digital camera 1 will be described below at the time of image reproduction by using the object file 30 stored in the external memory 123 as described above and the illumination data 236 (including the illumination data in the external memory) having been prepared in advance. FIGS. 13 and 14 are flowcharts showing the flow of the operation of the digital camera 1 in the reproduction mode. Image reproduction is carried out by an Image reproduction section 206 shown in FIG. 4.

When the user operates the operation button unit 126 to shift the mode of the digital camera 1 to the reproduction mode, the table of thumbnail images is indicated on the display 125 on the basis of the thumbnail data included in the headers 31 of plural object files 30 in the external memory 123 (at step ST301).

Figure 15:
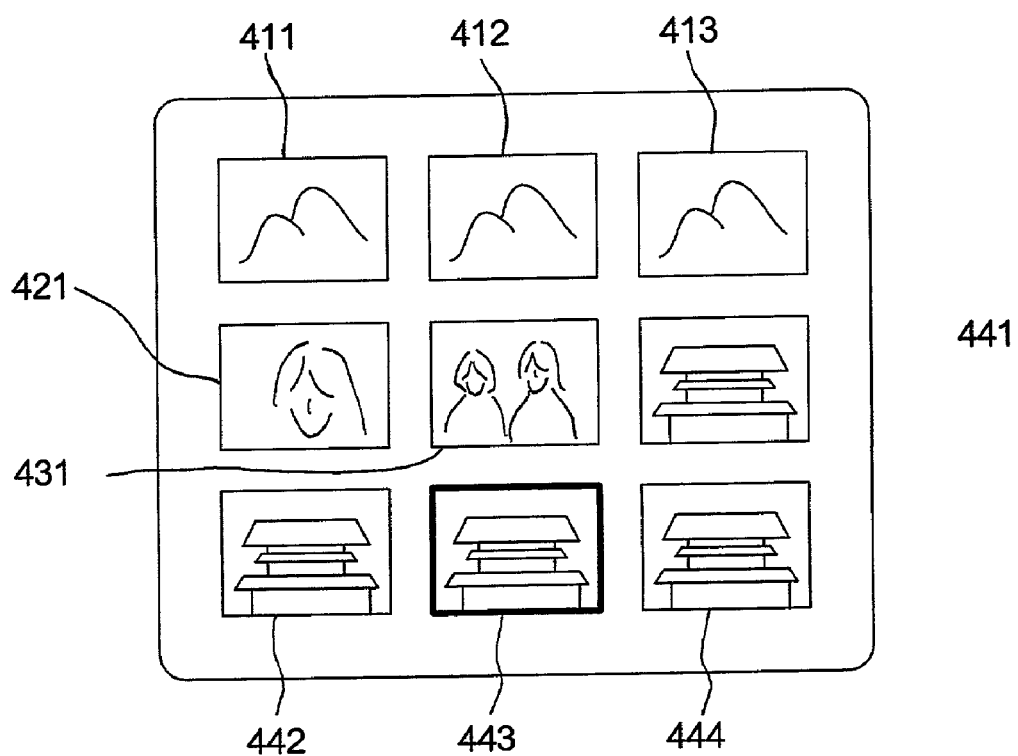
FIG. 15 is a view showing a table of the thumbnail images.

FIG. 15 is a view showing a screen frame indicating a table of thumbnail images. In FIG. 15, the thumbnail images 411 to 413 indicate the same object and are included in one object file 30. The thumbnail images 411 to 413 are images generated by using different kinds of illumination data 236. For example, these images were generated by selecting "D65 light source," "Fluorescent lamp 1" and "Sunlight," respectively, on the screen frame shown in FIG. 9. The thumbnail images 421 and 431 are included in different object files 30, respectively. The thumbnail images 441 to 444 indicate the same object and are included in one object file 30. The thumbnail images 441 to 444 are images generated on the basis of four different color temperatures in FIG. 11, for example.

By referring to the table of the thumbnail images and by using the operation button unit 126, the user selects an image to be reproduced. In other words, the user tentatively selects one thumbnail image by using the upper, lower, right and left buttons, and determines the selection by using the center button.

Figure 16:
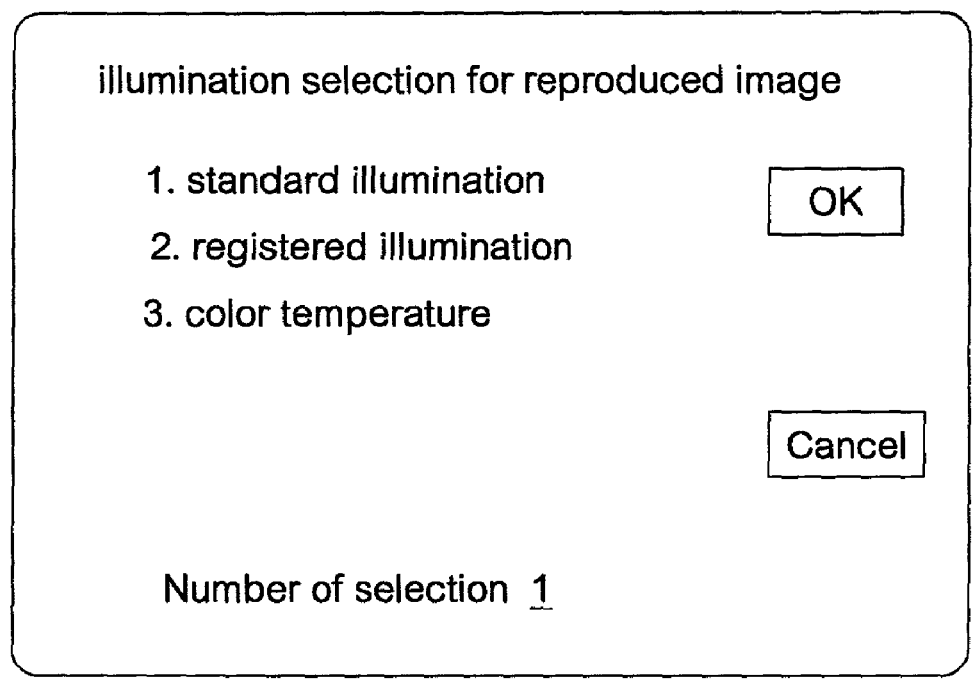
FIG. 16 is a view showing a screen frame for selecting illumination for an image to be reproduced.

The selection by using the center button is classified as a single-click selection and a double-click selection (the button is pressed twice continuously). In the case of the single-click selection (at step ST302), a screen frame for selecting the illumination data 236 to be combined with the object color data 235 is shown on the display 125 as shown in FIG. 16. When an item is selected on the screen frame shown in FIG. 16, the screen frame is shifted to one of the illumination selection screen frames shown in FIGS. 9 to 11 (at step ST304). The items of the illumination data registered at the time of photographing are added to the screen frame shown in FIG. 10.

The selection of the illumination (the selection of the illumination data 236) is accepted by the digital camera 1 (at step ST305), and the illumination data 236 to be combined is specified (or read from the external memory 123 to the RAM 23) (at step ST306). On the other hand, the object color data 235 corresponding to the thumbnail image selected at step ST302 is read from the external memory 123 (at step ST309), and the object color data 235 is combined with the illumination data, thereby generating image data (at step ST311).

The combining process is similar to the generation of the thumbnail data 237 except for the size of the image. The operations indicated by Expressions 3 and 4 are carried out to obtain the RGB values of individual pixels. An image is shown on the display 125 in accordance with the image data (at step ST312), and the same object as that of the selected thumbnail image is reproduced as an image in the selected illumination.

When a thumbnail image is selected by double-click selection (at step ST303), illumination information corresponding to the selected thumbnail image is read (at step ST307). The illumination data 236 (illumination data used to generate the data of the selected thumbnail image) corresponding to the illumination information is then specified (at step ST308). Hereafter, the object color data 235 corresponding to the selected thumbnail image is read from the external memory 123 (at step ST309) and combined with the specified illumination data, whereby an image is indicated on the display 125 (at steps ST311 and ST312). Hence, an image is reproduced in an illumination environment similar to that of the thumbnail image. The reproduced image is stored in the external memory 123 in an ordinary image format (the image may be compressed) as necessary.

As described above, the digital camera 1 obtains the object color data 235 corresponding to image data wherein the effect of the illumination environment is eliminated from the first image taken in the ON state of the flash, the second image taken in the OFF state of the flash and the relative spectral distribution of the flash light. The thumbnail data 237 is generated as image data in which the object indicated by the object color data 235 is reproduced, and the object color data 235 is stored together with the thumbnail data 237 in the external memory 123.

Hence, the thumbnail image can be referred at the time of image reproduction. As a result, it is possible to easily and promptly recognize what kind of object the object color data 235 indicates, without reproducing an image from the object color data 235 by taking a time or without guessing the object according to the name of the file of the object color data. In other words, the object color data can be handled easily, whereby the operability at the time of image reproduction can be improved.

At the time of image reproduction, one of plural candidates of the illumination data 236 can be combined with the object color data 235 as desired, whereby it is possible to reproduce an image of a desired object in a desired illumination environment. The illumination data can be obtained from the object color data 235 and the second image data in the digital camera 1, whereby it is possible to easily reproduce the image in the illumination environment at the time of photographing.

Furthermore, by providing the standard light (D65, D50, etc.) as the illumination data 236 as shown in FIG. 9, it is possible to accurately reproduce the colors of the object from the image obtained in a desired illumination environment. Hence, appropriate images can be generated as images for printing or images for Internet shopping.

Still further, since the thumbnail data 237 is stored in the header 31 of the object file 30, the thumbnail data 237 and the object color data 235 are handled integrally. Hence, when the object color data 235 is copied to another recording medium or deleted, the thumbnail data 237 is copied or deleted simultaneously, whereby the object color data 235 can be handled easily.

Even in the generation of the thumbnail data 237, plural types of illumination can be selected, whereby data of a desired thumbnail image can be generated.

Still further, by storing data of plural thumbnail images in the header 31, plural thumbnail images in changed illumination environments can be referred to. In this case, by double-clicking the center button when selecting a thumbnail image, the illumination data 236 used when the thumbnail data 237 was generated is automatically combined with the object color data 235. It is thus possible to omit the procedure for selecting the illumination data 236.

When the thumbnail data 237 is generated, the object color data 235 is reduced and then combined with the illumination data. For this reason, the amount of operation is reduced more in comparison with the case when the illumination data is combined with the object color data 235 and then reduction is carried out. As a result, the thumbnail data 237 can be generated promptly.

On the other hand, the object color data 235 and the thumbnail data 237 can be obtained by simply modifying the specifications of a digital camera having a CCD provided with a general-purpose on-chip filter, whereby the digital camera 1 is not required to have any special mechanisms. Hence, the action for obtaining the object color data 235 and the thumbnail data 237 can be attained as a special mode of the general-purpose digital camera 1, thereby causing no extra production cost.

Figure 17:
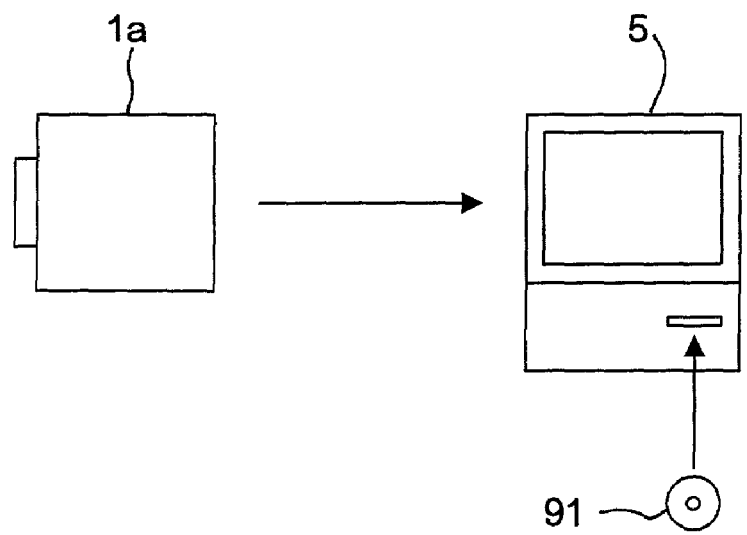
FIG. 17 is a view showing a digital camera and a computer.

A second embodiment will be described below. In the first embodiment, image data is processed inside the digital camera. However, image data can also be processed by a computer as a matter of course. FIG. 17 is a view showing the relationship between a digital camera 1a and a computer 5 in the case when images are stored and controlled by using the computer. In the digital camera 1a, image data obtained by the CCD is directly stored in an external memory. In the computer 5, the image data is read from the external memory to obtain object color data, thumbnail data, illumination data, etc.

The digital camera 1a has a configuration similar to that shown in FIG. 3. First image data obtained in the ON state of the flash, second image data obtained in the OFF state of the flash and flash spectral data regarding the flash light are stored in the external memory 123. These kinds of data are transferred to the computer 5 via the external memory 123. In other words, the digital camera 1a has only the function of obtaining images, but does not have functions of obtaining object color data, thumbnail data and illumination data or a function of generating object files. The flash spectral data may be prepared in advance in the computer 5.

Figure 18:
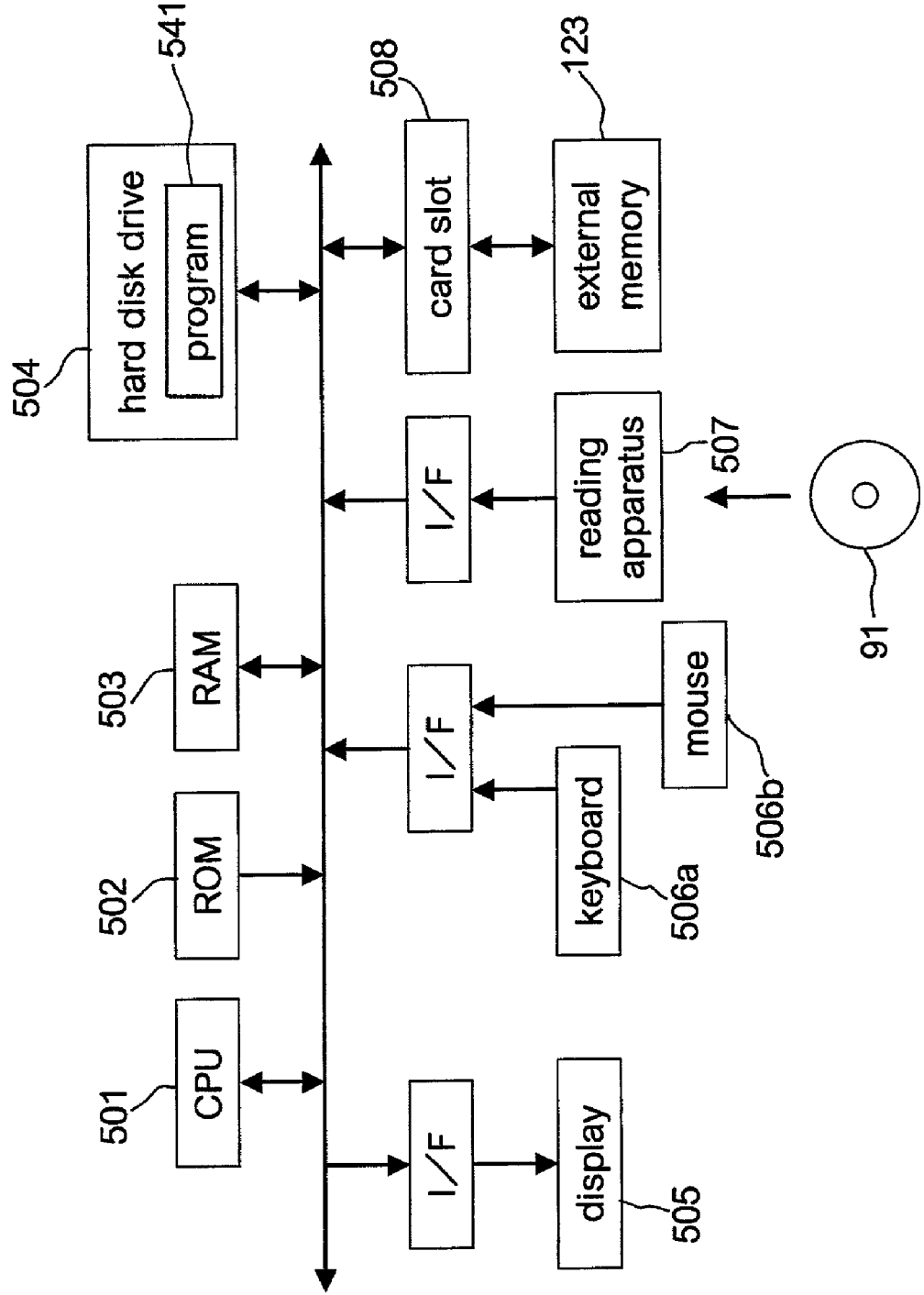
FIG. 18 is a block diagram showing the internal configuration of the computer.

The computer 5 as a general computer system configuration wherein a CPU 501 for carrying out various operation processing, a ROM 502 for storing basic programs and a RAM 503 for storing various kinds of information are connected to a bus line as shown in FIG. 18. Furthermore, a hard disk drive 504 for storing information, a display 505 for indicating various kinds of information, a keyboard 506a and a mouse 506b for receiving input from the user, a reading apparatus 507 for reading information from a recording medium 91, such as an optical disk, a magnetic disk and a magneto-optical disk, and a card slot 508 for reading image data from the external memory 123 are also connected to the bus line via interfaces (I/F) and the like as necessary.

In the computer 5, a program has been read from the recording medium 91 via the reading apparatus 507 and stored in the hard disk drive 504 in advance. The program is then copied to the RAM 503, and the CPU 501 executes operation processing in accordance with the program inside the RAM 503. The computer 5 thus operates as an image control apparatus.

The CPU 501, ROM 502 and RAM 503 inside the computer 5 function as the differential image generation section 201, object color data generation section 202, thumbnail data generation section 203, file generation section 204, illumination data generation section 205 and image reproduction section 206 shown in FIG. 4. As a result, the computer 5 generates the object color data corresponding to image data wherein the effect of the illumination environment is eliminated from the first image data, the second image data and the flash spectral data. Furthermore, the computer 5 generates illumination data corresponding to an illumination environment component, and also generates the thumbnail data 237 and the object file 30. In other words, the computer 5 carries out the actions to be performed at steps ST103 to ST106, ST111 to ST120, ST301 to ST309, ST311 and ST312. When the second embodiment is compared with the first embodiment, the RAM 503 corresponds to the RAM 23 of the digital camera 1, the keyboard 506a and the mouse 506b correspond to the operation button unit 126 of the digital camera 1, and the display 505 corresponds to the display 125 of the digital camera 1.

As described above, the digital camera 1 in accordance with the first embodiment can be attained by using the digital camera 1a and the computer 5. As a result, by referring to thumbnail images indicated on the display 505, object color data can be handled easily, and operability at the time of image reproduction can be improved.

Modified embodiments will be described below. In the first embodiment, the power source voltage and light emission time of the flash 121 are maintained constant thereby to maintain the spectral distribution of the flash light constant. However, another method may also be used to maintain the light emission characteristics of the flash 121 constant. For example, the light emission characteristics of the flash may be maintained constant by using pulse-like light emission from the flash 121.

On the other hand, the spectral distribution of the flash light may be obtained by measuring the power source voltage and light emission time. For example, an actual spectral distribution may be obtained by storing some spectral distributions of the flash light corresponding to typical power source voltage and light emission time in advance and by interpolating these spectral distributions. Furthermore, an approximate spectral distribution of the flash light may be specified by storing spectral distributions of the flash light corresponding to the typical power source voltage and light emission time in the form of a lookup table and by only referring to the lookup table.

Furthermore, in the above-mentioned embodiments, two images are obtained while the ON/OFF states of the flash are switched thereby to obtain the object color data 235. However, any kinds of methods may be adopted as a method of obtaining the object color data 235. For example, by providing a multi-band sensor in the digital camera 1 and by obtaining an approximate spectral distribution of illumination light, i.e., illumination data, the object color data 235 may be obtained from the image data and the illumination data. As a compact high-resolution multi-band sensor, a CCD provided with metal film interference filters having thickness values being different stepwise is known, as described in "Spectrocolorimeter CM-100" by Norikazu Kawagoe and two persons, Minolta Techno Report No. 51988 (on pages 97 to 105). In this multi-band sensor, the thickness of the metal film interference filter is changed for each CCD area. Hence, the intensity of the light having a predetermined wavelength band can be obtained for each CCD area.

Still further, by sequentially positioning plural color filters ahead of a monochrome CCD to obtain plural images, the object color data 235 may be obtained from these images. For example, it is possible to adopt a method described in "A camera system and an algorithm for attaining chromatic constancy" by Masaharu Tominaga, Shingaku Technical Report PRU95-11 (1995-05) (on pages 77 to 84).

As a modification of the above-mentioned method, the object color data 235 may be obtained by obtaining plural images by switching the presence/absence of at least one filter ahead of a color CCD. The illumination data may be any kinds of data provided that the data indicates the effect of an illumination environment on an image and should only indicate the effect of the illumination environment to some extent. The object color data may be any kinds of data provided that the data indicates a component wherein the effect of the illumination environment is eliminated from the image. The object color data is not required to be data that indicates a component wherein the effect of the illumination environment is eliminated strictly.

Still further, in the above embodiments, it is explained that the object color data and the illumination data are stored as plural weight coefficients (and basis functions). However, the storage format of these kinds of data may have other formats. For example, the object color data may be stored as the characteristic curve of spectral reflectance, and the illumination data may be stored as the characteristic curve of a spectral distribution.

In the above-mentioned embodiments, the thumbnail data 237 is stored in the header 31 of the object file 30. However, any methods may be used provided that the thumbnail data 237 is stored together with the object color data 235 so as to have a relationship therebetween. For example, it may be possible that the object color data 235 and the thumbnail data 237 are stored as independent files and that link information is added to provide a link therebetween. In other words, if automatic access from at least the thumbnail data 237 to the object color data 235 corresponding thereto is possible, image reproduction on the basis of the object color data 235 is attained by selecting one thumbnail image from the table of thumbnail images, whereby operability can be improved. The weight coefficients and basis functions of the object color data and the illumination data may be stored independently (as independent files). The format of the object file may also be determined as desired.

In the above-mentioned embodiments, the user selects the illumination data corresponding to plural color temperatures. However, when "Color temperature" is selected in FIG. 8, plural thumbnail images corresponding to the plural color temperatures may be generated automatically. In the above-mentioned embodiments, illumination data indicating the illumination environment at the time of photographing is generated from image data. However, the illumination data indicating the illumination environment at the time of photographing may be selected from data prepared in advance (for example, indoor illumination environment and sunlight). Still further, in the above-mentioned embodiments, it is described that the CPU and the like inside the digital camera 1 or the CPU and the like inside the computer 5 attains the major functions shown in FIG. 4 by virtue of software. However, all or part of these functions may be attained by special-purpose electric circuits.

Not all the processes required for image storage and control are required to be executed only by the digital camera 1 or the computer 5. The execution of the processes may be shared as desired. For example, the processes up to the generation of the object color data 235 may be executed by the digital camera, and the generation of the thumbnail data 237 and the object file 30 and image reproduction may be executed by the computer.

In the above-mentioned embodiments, the thumbnail image data is stored together with the object color data so as to have a relationship therebetween. Hence, what kind of object is indicated by the object color data can be recognized easily on the basis of the thumbnail image. Hence, the object color data can be handled easily.

Furthermore, in the above-mentioned embodiments, thumbnail image data incorporating a desired illumination environment can be generated. Still further, the thumbnail image data and the object color data can be handled integrally, whereby the object color data can be handled easily. Moreover, the thumbnail image data can be generated promptly.

In addition, in the above-mentioned embodiments, it is possible to refer to plural thumbnail images with illumination environments having been changed. Furthermore, the illumination data selection procedure can be omitted. Moreover, the thumbnail image data can be generated promptly. Still further, what kind of object is indicated by the object color data can be recognized easily on the basis of the thumbnail image, whereby the object color data can be handled easily.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A camera comprising:
   first photographing means for obtaining first image data by photographing an object illuminated by ordinary light;
   second photographing means for obtaining second image data by photographing the object illuminated by the ordinary light and by light having known spectral characteristics;
   acquisition means for obtaining spectral reflectance of the object based on the first image data, the second image data and the known spectral characteristics, wherein the spectral reflectance is determined from the first image data and the second image data from which the effects of illumination have been removed by factoring out the known spectral characteristics;
   generating means for generating thumbnail image data on the basis of the obtained spectral reflectance and illumination data regarding a predetermined illumination light; and
   memory for storing the thumbnail image data and the spectral reflectance having a relationship between the thumbnail image data and the spectral reflectance.

2. A camera as claimed in claim 1, wherein the acquisition means for obtaining spectral reflectance obtains the spectral reflectance by determining differential image data between the first image data and the second image data, then by removing the known spectral characteristics of the light having known spectral characteristics.

3. A camera as claimed in claim 1, wherein the spectral reflectance comprises differential image data with the known spectral characteristics of the light having the known spectral characteristics removed, wherein the differential image data comprises the difference in the image data between the first image data and the second image data.

4. A camera as claimed in claim 1, wherein the spectral reflectance of an object consists of image data of the object without an effect of illumination.

5. An image management method comprising the steps of:
   receiving spectral reflectance of an object, wherein the spectral reflectance is first image data from which the effects of illumination have been removed by factoring out known spectral characteristics of a light used to generate the first image data and receiving illumination data regarding a predetermined illumination light;
   generating second image data on the basis of the spectral reflectance and the illumination data regarding the predetermined illumination light; and
   storing the second image data and storing the spectral reflectance having a relationship between the second image data and the spectral reflectance.

6. An image management method as claimed in claim 5, wherein the generated third image data is image data for a thumbnail image that is smaller than an image of the object.

7. An image management method as claimed in claim 5, wherein the spectral reflectance of an object consists of differential image data and flash spectral data.

8. An image management apparatus for controlling image data, comprising:
   generating means for generating thumbnail image data, which represent an object corresponding to spectral reflectance of the object, based on the spectral reflectance and a predetermined illumination data, wherein the spectral reflectance is first image data from which the effects of illumination have been removed by factoring out known spectral characteristics of a light used to generate the first image data; and
   memory for storing said thumbnail image data together with the spectral reflectance having a relationship between the thumbnail image data and the spectral reflectance.

9. An image management apparatus as claimed in claim 8, further comprising:
   receiving means for receiving a selection of illumination data used for the generation of the thumbnail image data from plural candidates of illumination data.

10. An image management apparatus as claimed in claim 8, wherein the memory stores the thumbnail image data in the header of a file in which the spectral reflectance is stored.

11. An image management apparatus as claimed in claim 8, wherein the generating means comprises:
    means for generating reduced data by reducing the spectral reflectance in proportion to a size of a thumbnail image, and
    means for combining the illumination data with the reduced data.

12. An image management apparatus as claimed in claim 8, wherein the memory stores data of plural thumbnail images together with the spectral reflectance having a relationship between the thumbnail image data and the spectral reflectance.

13. An image management apparatus as claimed in claim 12, further comprising:
    means for indicating the plural thumbnail images,
    means for receiving a selection of one thumbnail image from said plural thumbnail images, and
    means for generating image data by combining the spectral reflectance with the illumination data used when the data of the one thumbnail image is generated.

14. An image management apparatus as claimed in claim 8, wherein the spectral reflectance of an object consists of differential image data and flash spectral data.

15. A digital image pickup apparatus comprising:
    obtaining means for obtaining image data of an object,
    generating means for generating spectral reflectance of an object corresponding to the image data without an effect of illumination from the image data, wherein the spectral reflectance is the image data from which the effects of illumination have been removed by factoring out the known spectral characteristics,
    thumbnail generating means for generating thumbnail image data which represents an object corresponding to spectral reflectance, based on the spectral reflectance and predetermined illumination data, and
    a memory for storing the thumbnail image data together with the spectral reflectance having a relationship between the thumbnail image data and the spectral reflectance.

16. A digital image pickup apparatus as claimed in claim 15, wherein the spectral reflectance of an object consists of differential image data and flash spectral data.

17. An image management method for controlling data regarding images, comprising the steps of:
generating thumbnail image data, which represents an object corresponding to spectral reflectance, based on the spectral reflectance and predetermined illumination data, wherein the spectral reflectance on first image data from which the effects of illumination have been removed by factoring out known spectral characteristics of light; and
storing the thumbnail image data together with the spectral reflectance having a relationship between the thumbnail image data and the spectral reflectance.

18. An image management method as claimed in claim 17, wherein the spectral reflectance of an object consists of differential image data and flash spectral data.

19. A computer-readable recording medium encoded with a computer program for causing a computer to control data regarding images is recorded, wherein an execution of the program by the computer comprises:
generating thumbnail image, which represents an object corresponding to spectral reflectance, based on the spectral reflectance and predetermined illumination data, wherein the spectral reflectance is image data from which the effects of illumination have been removed by factoring out the known spectral characteristics, and
storing the thumbnail image data together with the spectral reflectance having a relationship between the thumbnail image data and the spectral reflectance.

20. A recording medium as claimed in claim 19, wherein the spectral reflectance of an object consists of differential image data and flash spectral data.

21. An image generation apparatus for generating thumbnail image data, comprising:
generating means for generating reduced data of an image by reducing spectral reflectance corresponding to image data in proportion to a size of a thumbnail image, wherein the spectral reflectance is image data from which the effects of illumination have been removed by factoring out the known spectral characteristics, and
thumbnail generating means for generating thumbnail image data by combining the reduced data with illumination data indicating an effect of illumination on the image.

22. An image generation apparatus as claimed in claim 21, wherein the generating means reduces spectral reflectance by removing illumination effects from the image.

23. An image generation apparatus as claimed in claim 21, wherein the spectral reflectance of an object consists of differential image data and flash spectral data.

24. A computer-readable recording medium encoded with a computer program for causing a computer to generate image data is recorded, wherein an execution of the program by the computer comprises the steps of:
indicating plural thumbnail images,
receiving a selection of one thumbnail image from the plural thumbnail images,
specifying spectral reflectance on the basis of the one thumbnail image, wherein the spectral reflectance is image data from which the effects of illumination have been removed by factoring out the known spectral characteristics, and
generating image data by combining the spectral reflectance with illumination data indicating the effect of illumination on the image.

25. A recording medium as claimed in claim 24, wherein the spectral reflectance of an object consists of differential image data and flash spectral data.

* * * * *